US011270468B1

(12) United States Patent
Chang et al.

(10) Patent No.: US 11,270,468 B1
(45) Date of Patent: Mar. 8, 2022

(54) JOINT COLOR IMAGE AND TEXTURE DATA COMPRESSION

(71) Applicant: Facebook Technologies, LLC, Menlo Park, CA (US)

(72) Inventors: Cheng Chang, Redmond, WA (US); Richard Webb, Sammamish, WA (US); Richard Lawrence Greene, Redmond, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 17/126,440

(22) Filed: Dec. 18, 2020

(51) Int. Cl.
| | |
|---|---|
| G06T 11/00 | (2006.01) |
| G06T 9/00 | (2006.01) |
| G06T 15/00 | (2011.01) |
| G06T 19/00 | (2011.01) |
| H04N 1/60 | (2006.01) |
| H04N 19/00 | (2014.01) |
| H04N 19/12 | (2014.01) |
| H04N 19/17 | (2014.01) |
| G09G 5/00 | (2006.01) |
| G06K 9/46 | (2006.01) |
| G06T 7/90 | (2017.01) |

(52) U.S. Cl.
CPC . *G06T 9/00* (2013.01); *G06T 7/90* (2017.01)

(58) Field of Classification Search
CPC combination set(s) only.
See application file for complete search history.

(56) References Cited

U.S. PATENT DOCUMENTS

| | | | |
|---|---|---|---|
| 7,796,823 B1* | 9/2010 | Budagavi | G06T 9/00 382/232 |
| 10,645,386 B1 | 5/2020 | Ihara et al. | |
| 2006/0056508 A1* | 3/2006 | Lafon | H04N 19/172 375/240.03 |
| 2011/0150330 A1* | 6/2011 | Jannard | H04N 19/63 382/166 |
| 2017/0099410 A1* | 4/2017 | Iguchi | H04N 1/32229 |
| 2017/0150147 A1 | 5/2017 | Forsyth et al. | |
| 2018/0288356 A1* | 10/2018 | Ray | H04N 13/139 |
| 2019/0164330 A1 | 5/2019 | Sugano | |
| 2019/0174140 A1* | 6/2019 | Iourcha | H04N 19/426 |
| 2019/0281267 A1 | 9/2019 | Fuchie et al. | |

* cited by examiner

*Primary Examiner* — Wesner Sajous
(74) *Attorney, Agent, or Firm* — Baker Botts L.L.P.

(57) ABSTRACT

In an embodiment, a method involves accessing a first pixel block of an image, the first pixel block comprising pixels, each associated with three color values, determining whether to separately or jointly encode the three color values of each of the pixels of the first pixel block, determining that the three color values of each of the pixels in the first pixel block are to be jointly encoded based on (1) determining, based on the three color values of each of the pixels, a line defined within a three-dimensional coordinate system in which each of the pixels is represented as a three-dimensional point and (2) determining that the line satisfies a predetermined criteria, and encoding the three color values of each of the pixels in the first pixel block as a single quantized value based on a projection of the three-dimensional point associated with that pixel onto the line.

20 Claims, 14 Drawing Sheets

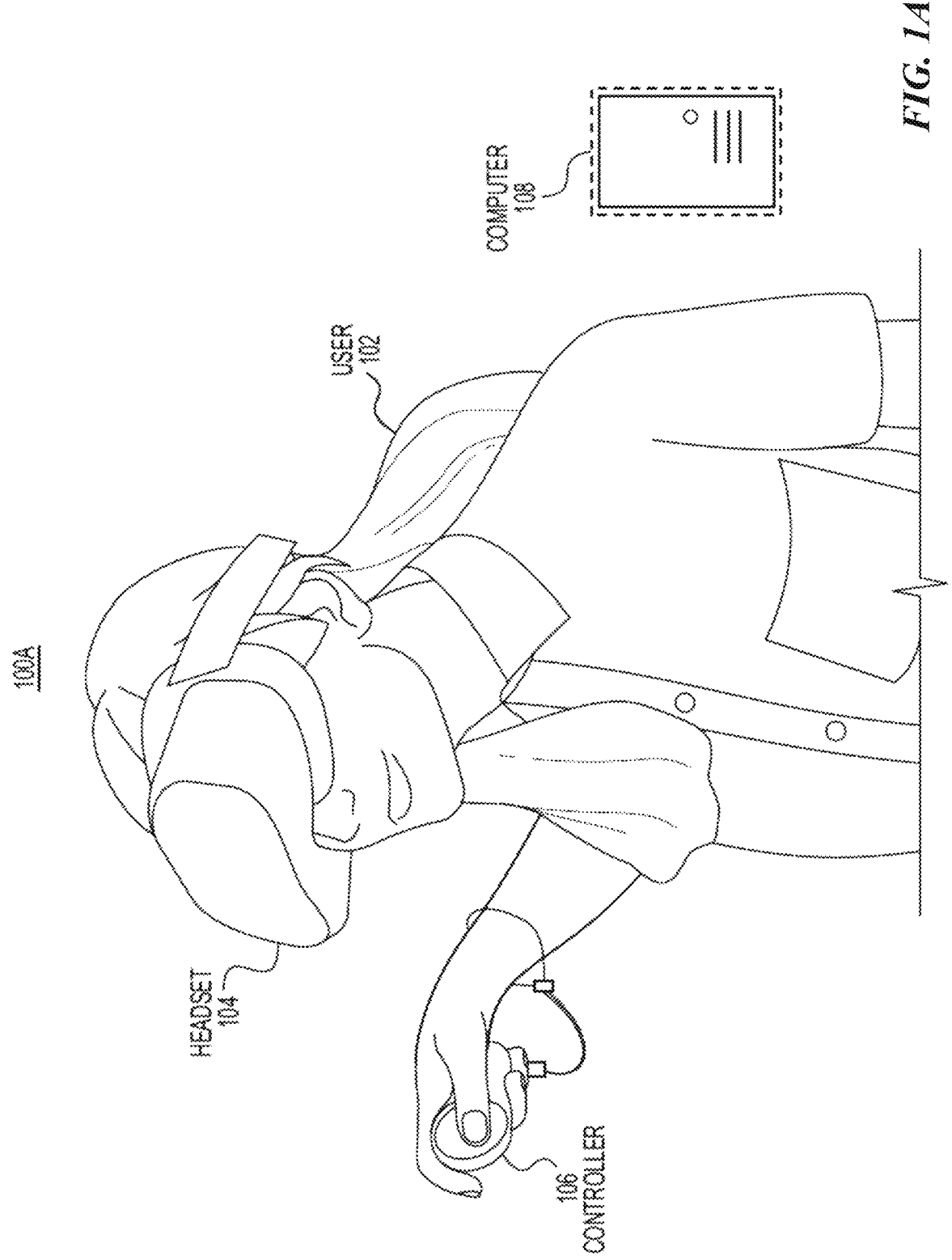

ately encoding certain pixel blocks of an image based on the concept of Principal Component Analysis if the color values within the block are highly correlated to each other. The high-level idea is that, if pixel color values within a block are highly correlated to each other, the color values for the entire block can be jointly encoded into a simplified representation that captures most of the color information. This technique, referred to as the joint-color mode, can be selectively applied to certain pixel blocks in an image if the block is suitable for the joint-color mode (e.g., high correlation of pixel color values), while the color channels of the other blocks are encoded separately, which may be referred hereinafter as the standard encoding method.

JOINT COLOR IMAGE AND TEXTURE DATA COMPRESSION

TECHNICAL FIELD

This disclosure generally relates to generating graphics for an artificial reality scene.

BACKGROUND

Artificial reality involves the display of computer-generated graphics to a user in an immersive manner. The goal is to cause the user to experience the computer-generated graphics as though they existed in the world before them. Rendering computer-generated graphics for artificial reality is a computationally-intensive task, often requiring expensive and specialized hardware. This is due at least in part to the requirement that the graphics displayed to the user must be very high quality. For a user to believe that the graphics represent, or are a part of, the world around them, the graphics must be believably high quality. The screen-door effect, where either the graphics or the display used to project the graphics allow the user to see lines between pixels can ruin any sense of immersion. Furthermore, graphics for artificial reality scenes are often interactive—when a user "moves" in the virtual space, the space moves with or in response to them. Latency between a user's movement, or movement command, and displaying the effects of that movement can cause great discomfort to the user, such as virtual-reality sickness. Because a user's movements are typically unpredictable, pre-rendering most components of an artificial reality scene is impractical.

SUMMARY OF PARTICULAR EMBODIMENTS

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Particular embodiments disclosed herein are directed to image compression techniques that leverage strong RGB color correspondences between pixels in a pixel block. Conventional compression techniques are typically asynchronous, thus are too slow to allow real-time encoding and decoding. To allow images to be encoded/decoded faster, embodiments of this disclosure provide a method of selec- Principal Component Analysis (PCA) is a method used to reduce the dimensionality of large data sets, by transforming a large set of variables into a smaller one that still contains most of the information in the large set. Here, the disclosed embodiments provide techniques for determining whether the pixel color values within a block are highly correlated with each other using PCA to find the largest eigenvalue and the dominant eigenvector for the pixel block. If there is a sufficiently dominant eigenvector, the pixel color values within the block are highly correlated, which means that the color values of the block can be jointly encoded using the joint-color mode. If, however, the pixel color values in the block are not highly correlated, then the pixel color values are encoded separately (normal mode). However, in some embodiment, pixel blocks may not be encoded with the joint-color mode even if the color values of the block are highly correlated to each other, because if a block is comprised of over-exposed pixels (e.g., a block with high-contrast edges or a group of saturated pixel values (255)), the joint-color mode may not be able to accurately represent the color information of the block, thereby producing undesirable artifacts.

Particular embodiments disclosed herein are directed to a compression technique referred to as the adaptive range packing technique which involves compressing various types of pixel data into two-dimensional arrays of values. For example, the adaptive range packing technique may be used to compress types of data corresponding to image colors, depth, and motion or optical flow. In particular embodiments, the adaptive range packing technique compresses pixel data by a constant rate, such that the amount of compression resulting from the technique results in, on average, a predictable and substantially constant rate. Some embodiments describe utilizing the adaptive range packing technique for compressing pixel arrays in a lossless fashion. Other embodiments describe utilizing the adaptive range packing technique for compressing pixel arrays in a lossy fashion.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 1A illustrates an example artificial reality system.

DESCRIPTION OF EXAMPLE EMBODIMENTS

Figure 1B:
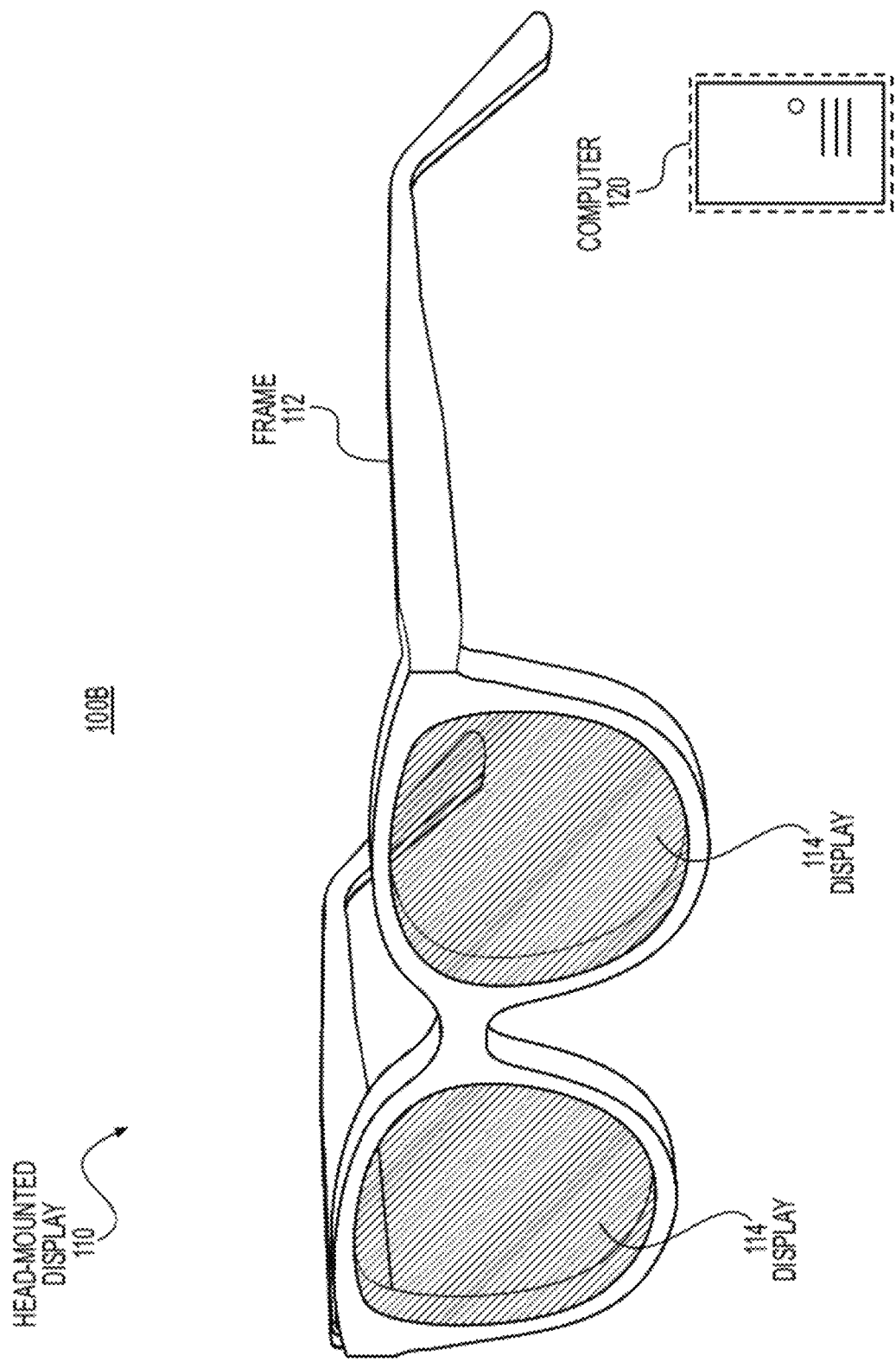
FIG. 1B illustrates an example augmented reality system.

Because artificial reality devices involve creating digital scenes or superposing computer-generated imagery onto a view of the real world, they provide a platform for designers and engineers to provide new forms of information, entertainment, or methods of collaboration. For example, artificial reality devices may allow users to communicate, seemingly in person, over long distances, or assist users by informing them of the environment around them in an unobtrusive manner. Because artificial reality experiences can often be customized, the user's experience with artificial reality may be deeply personal and highly engaging if presented with sufficient clarity and convenience.

One way that artificial reality experiences can augment human ability is with computer-generated images and/or text added to the real world, as in an augmented or mixed reality. From this simple principle, a variety of compelling use cases can be considered. Labels (e.g., texts, glyphs, etc.) or images describing a real-world object may be fixed in the world space (e.g., location-aware labels acting as street signs or providing a live map of a bike path), or images fixed to a real-world object as it moves through the space (e.g., a label added to a bus as it going on its route that provides detailed information about its route or capacity). Labels could also be used to help a user navigate through an unfamiliar city (e.g., creating a waypoint for the nearest restroom), or help find a friend in a crowd (e.g., a socially-aware waypoint fixed to another user). Other experiences worth considering may be based on interactions with real-world objects. For example, a user could "project" video onto a wall or screen that allows for the video to be played and visible to only herself or to others with access to a shared augmented space. As another example, a user could fix computer-generated text to a physical object to act as an augmented-reality book or magazine. Content could be displayed relative to the object (allowing a user to physical asset aside an augmented-reality) or could be displayed in a fixed relation to the user's (e.g., a tutorial video constantly playing in a corner of the view). Presented media could be customized to the user, so that the same content display space could content relevant to each person viewing the same physical space. As another example, a user could interact with computer-generated graphics by "touching" an icon, or "manipulating" the computer-generated images manually. These graphics could be shown to multiple users working on a project, enabling opportunities for team collaboration (e.g., multiple architects working on a three-dimensional digital prototype in a building together in real-time).

To facilitate use, the display that outputs the computer-generated graphics should be intuitive, constantly accessible, and unobtrusive. One approach for displaying high definition artificial reality graphics to a user is based on a head-mounted display. The user wears an apparatus, such as a visor, headset, or glasses, capable of displaying computer graphics display. In augmented or mixed reality experiences, the computer graphics can be seen alongside, or on top of, the physical world. However, rendering these computer graphics is computationally intensive. Therefore, in most cases rendering is performed by powerful computers communicatively attached (e.g., via a cable or wireless communication protocol, such as Bluetooth) to a head-mounted display. In such a configuration, the head-mounted display is limited by bulky cords, bandwidth and power limitations, heat restrictions, and other related constraints. Yet, the limits of these constraints are being pushed. Head-mounted displays that are comfortable and efficient enough for day-long wearing, yet powerful enough to display sophisticated graphics are currently being developed.

One technique used to reduce actual display size without impacting apparent display size is known as a scanning display. In a scanning display, multiple smaller images are combined to form a larger composite image. The scanning display uses source light, one or more scanning elements comprising reflectors, and an optics system to generate and output image light. The output image light may be output to the eye of the user. The source light may be provided by emitters, such as light-emitting diodes (LEDs). For example, the light source may be an array of 2560×1440 LEDs. The reflectors may be any suitable reflective surface attached to the scanning element. In particular embodiments, the scanning element may be a scanning mirror driven using one or more microelectromechanical systems (MEMS) components. The optics system may comprise lenses used to focus, redirect, and otherwise augment the light. The scanning element may cause the source light, treated by light guiding components, to be output to the eye of the user in a specific pattern corresponding to a generation pattern used by the emitters to optimize display draw rate. Because, for example, all emitters need not be active at once, and in addition to a variety of other factors, scanning displays may require less power to run, and may generate less heat, than traditional display comprised of the same emitters. They may have less weight as well, owing in part to the quality of the materials used in the scanning element and optics system. One consequence of using a scanning display is that in exchange for, e.g., power, weight, and heat efficiency, a scanning displays may not perfectly display images as presented to them, e.g., images intended for traditional displays. There may be non-uniform distortions such as geometric warping of images and distortion of colors and specifically brightness. As is explained further herein, these distortions can be corrected by post-processing graphics to-be displayed to counteract the distortion before they are passed to the display, creating the effect that there is no distortion. Although this disclosure describes displays in a particular manner, this disclosure contemplates any suitable displays.

Since its existence, artificial reality (e.g., AR, VR, MR) technology has been plagued with the problem of latency in rendering AR/VR/MR objects in response to sudden changes in a user's perspective of an AR/VR/MR scene. To create an immersive environment, users may need to be able to move their heads around when viewing a scene and the environment may need to respond immediately by adjusting the view presented to the user. Each head movement may slightly change the user's perspective of the scene. These head movements may be small but sporadic and difficult, if not impossible, to predict. A problem to be solved is that the head movements may occur quickly, requiring that the view of the scene be modified rapidly to account for changes in perspective that occur with the head movements. If this is not done rapidly enough, the resulting latency may cause a user to experience a sensory dissonance that can lead to virtual reality sickness or discomfort, or at the very least, a disruption to the immersive nature of the experience. Re-rendering a view in its entirety to account for these changes in perspective may be resource intensive, and it may only be possible to do so at a relatively low frame rate (e.g., 60 Hz, or once every $\frac{1}{60}$th of a second). As a result, it may not be feasible to modify the scene by re-rendering the entire scene to account for changes in perspective at a pace that is rapid enough (e.g., 200 Hz, once every $\frac{1}{200}$th of a second) to prevent the user from perceiving latency and to thereby avoid or sufficiently reduce sensory dissonance. One solution involves generating a two-dimensional (2D) image of an object's texture from a particular view of the object, which maps to a three-dimensional (3D) "surface" of the object within the scene. A surface, or texture image, is comprised of object primitives that represent a particular view of the object. A surface corresponds to one or more objects that are expected to move/translate, skew, scale, distort, or otherwise change in appearance together, as one unit, as a result of a change in perspective. Instead of re-rendering the entire view, a computing system may simply resample these surfaces from the changed perspective to approximate how a corresponding object would look from the changed perspective. This method may significantly reduce the rendering processing and thus ensure that the view is updated quickly enough to sufficiently reduce latency. Resampling surfaces, unlike re-rendering entire views, may be efficient enough that it can be used to modify views within the allotted time—e.g., in $\frac{1}{200}$th of a second—with the relatively limited processing power of a computing system of a HMD. It may not be feasible for a system that is physically separate from the HMD (e.g., a separate laptop or wearable device) to perform the resampling process because the time scales involved in the resampling process are extremely small. For example, if the resampling process were to be performed in a physically separate system, the HMD would have to transmit information about the current position and orientation of the HMD, wait for the separate system to render the new view, and then receive the new view from the separate system. The present embodiments, to further speed up the overall rendering process, specifically the resampling process, provide compression techniques for selectively encoding certain pixel blocks of an image based on the concept of Principal Component Analysis if the color values within the block are highly correlated to each other. The present embodiments also disclose the adaptive range packing technique that leverages the similarities between the pixel values within a pixel block to represent the pixel values with reduced number of binary bits.

FIG. 1A illustrates an example artificial reality system 100A. In particular embodiments, the artificial reality system 100A may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HMD). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 2:
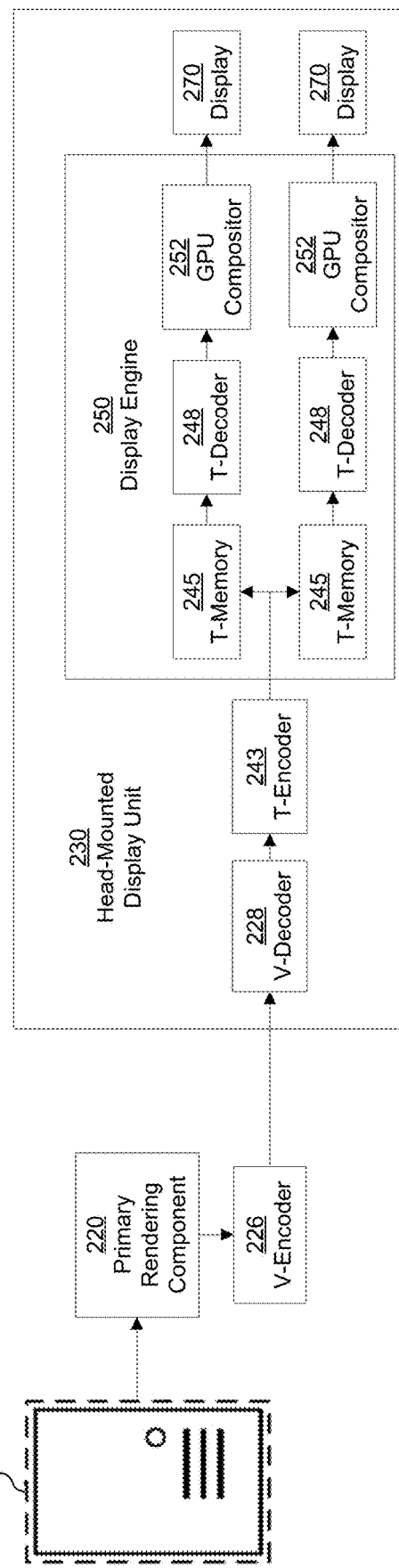
FIG. 2 illustrates an artificial reality graphics rendering and display system

FIG. 2 illustrates an artificial reality graphics rendering and display system 200. In particular embodiments, the rendering and display system 200 may comprise a reserve rendering component 210. The reserve rendering component 210 may be a remote rendering component used to perform supplemental rendering, or pre-render elements that can be prepared with less requirement of interactivity. For example, the reserve rendering component 210 may be a rendering server provided through a cloud computing network or local area network that handles pre-rendering of streaming video or other non-interactive components. The user may provide her own reserve rendering component 210 or may gain access to a reserve rendering component 210 as part of a subscription plan. The reserve rendering component may communicate wirelessly or through one or more wired connections to a primary rendering component 220. The primary rendering component 220 may be a standalone device such as a laptop or desktop computer, video game console, or any other suitable local graphics rendering system, or a device easily-worn on the user's body, such as a cellphone, tablet, or any other suitable compact graphics rendering system. The reserve rendering component 210 and/or primary rendering component 220 may perform several processes of a typical rendering pipeline. In particular embodiments, the primary rendering component 220 may be capable of rendering interactive graphics based on three-dimensional ("3D") models defined by a plurality of polygons and rendering instructions sufficient to support a frame refresh rate up to or surpassing 60 frames per second.

The primary rendering component 220 may receive primary rendering data for a rendering request. The primary rendering data may include two- or three-dimensional models, textures, and instructions for rendering computer-generated images, and other suitable information. The primary rendering component 220 may perform initial steps to render aspects of the artificial reality scene based on the received primary rendering data. For example, the primary rendering component 220 may perform visibility computations using ray tracing, rasterization, or other suitable techniques to determine which polygons of which 3D models of virtual objects in a virtual scene are visible through which pixels of a display. Based on the visibility determinations, the primary rendering component 220 may perform shading computations to determine the appropriate color for each pixel. In particular embodiments, the primary rendering component 220 may receive compressed or decompressed streaming video data from the reserve rendering component 210 at a rate of 30 frames per second, or similar. The primary rendering component 220 may combine data received from the reserve rendering component 210 with data generated by the initial rendering steps.

In particular embodiments, one or more specialized object primitives, e.g., "surfaces," for use by a display engine 250 may be generated. As an example, the primary rendering component 220 may generate surfaces by first rendering 2D images from 3D models, as in a typical rendering pipeline. The primary rendering component 220 may then generate surfaces from the 2D images using an additional post-processing method. As another example, the primary rendering component 220 may directly output surfaces from 3D models, eliminating extra steps directed only to rendering 2D images. As another example, the primary rendering component 220 may output 2D images from 3D models to a display engine 250. The display engine 250 may generate surfaces using an additional post-processing method based on the 2D images. In particular embodiments, the output of the primary rendering component 220 may be encoded by the v-encoder 226, then transmitted to the v-decoder of the head-mounted display unit 230.

Surfaces may comprise information useful for rendering one or more virtual objects of an artificial reality scene. The information may include location and/or position data for the surface in the scene, specified in the coordinate system of the view space relative to the virtual camera/viewer (alternatively, location of the surface may also be specified in any other suitable coordinate system, such as the world space coordinate system). The surface may further include texture data, represented by one or more texel arrays. Thus, in particular embodiments, a "surface" may be considered as a rectangular texture with a transformation matrix to specify its location within a scene. Each texel in the texel array may have color information and a 2D coordinate within the texel array (e.g., specified in (u, v) coordinates). In particular embodiments, the color information of each texel may indicate the intensity of several color channels (e.g., red, green, and blue) and alpha information that indicates the texel's transparency level (e.g., completely transparent, completely opaque, or somewhere in between). In other embodiments, the color information of a texel may indicate the intensity of red, green, and blue without separately specifying the transparency level. In this case, the value for each color may be pre-multiplied by the texel's associated transparency level (e.g., if the texel is fully transparent with an alpha level of 0, then the red, green and blue values for that texel would all be zeroed-out by being multiplied by the 0 alpha level).

The texture data of a surface may be generated based on the result of a standard graphic rendering pipeline, embodying techniques to optimally determine the colors that should be displayed by the pixels of a display or image based on the perspective of a viewer in a three-dimensional scene. In particular embodiments, the display engine 250 may limit the number of surfaces (e.g., a maximum of 16 surfaces or any other suitable number of surfaces) that it will process to ensure sufficient simplicity in the scene so that performance demands can be met (e.g., to output frames at 200-300 hertz). Therefore, certain virtual objects in the artificial reality scene may be grouped according to any suitable rule. Each surface may be a representation of one or more objects within the scene that are expected to move/translate, skew, scale, distort, or otherwise change in appearance together, as one unit, as a result of a change in a user's perspective of the scene (e.g., resulting from a HMD on a user's head moving to a different position and/or orientation). As an example and not by way of limitation, an avatar of a person and a hat worn by the avatar may correspond to one surface if it is determined that person and the hat would move/translate, skew, scale, distort, or otherwise change in appearance together, as one unit. In particular embodiments, a surface may correspond to sets of points (e.g., points making up an object) that are expected to move/translate, skew, scale, distort, or otherwise change in appearance as a single unit when a user's perspective of a scene changes.

The primary rendering component 220 may communicate with a head-mounted display unit 230 through one or more wired or wireless connections. In particular embodiments, a user may be able to select how the primary rendering component 220 and head-mounted display unit 230 communicate based on the user's needs. The head-mounted display unit 230 may be configured to receive data, such as surfaces and other rendering instructions, from the primary rendering component 220. The head-mounted display unit 230 may prepare to display an artificial reality scene to a user based on the received data. In particular embodiments, the head-mounted display unit 230 may comprise a display engine 250 and one or more displays 270. In particular embodiments, the displays 270 may be scanning displays, including all necessary emitters, scanning elements, and optical systems. The head-mounted display unit 230 may further comprise additional components not shown that facilitate the rendering and display of the artificial scene. These may include additional image processing components, eye-tracking components, heat detection components, any other suitable components, or any combination thereof.

Although this disclosure describes rendering components in a particular manner, this disclosure contemplates any suitable rendering components.

In particular embodiments, the display engine 250 and displays 270 of the head-mounted display may be configured specifically to enable a fast frame display or refresh rate. In typical interactive graphics rendering systems, a target frame rate may be at or around sixty frames per second. While this is sufficient for the images to appear as crisp, smooth moving video in traditional systems, it may not be sufficient for artificial reality. Because of the immersive nature of the artificial reality experience, and further exacerbated by the head-mounted nature of the display and its proximity to the user's eyes, artificial reality rendering and display system 200 may target much higher frame display rates, e.g., upwards of two to three hundred frames per second, in order to display images responsive to changes in the user's viewpoint and/or movement (e.g., head and/or eye movement). If this is not done quickly enough, the resulting latency may cause a user to experience a sensory dissonance that can lead to virtual reality sickness or discomfort. In particular embodiments, the artificial reality rendering and display system 200 may be capable of tracking and reacting to the user's eye movements. To provide smooth video when reacting to eye movement, the system 200 may target even higher display rates during particularly intense periods, e.g., bursts of up to eight hundred frames per second.

The entire system may be configured with these fast display rate benchmarks in mind. A target frame rate of 200 frames per second is roughly equivalent to one frame every 5 milliseconds. Significant time is lost by transmitting movement data to, and updating rendering data from, a powerful graphics processor over wireless, or even wired connections. Therefore, at least some amount of graphics preparation must occur in a head-mounted unit, reducing the time lost in transmission. However, a head-mounted display unit 230 has weight, power, and space constraints that must be adhered to for the comfort of the user. These weight, power, and space constraints restrict the components and computational power available for a head-mounted display unit 230. In fact, using conventional approaches, components available for a head-mounted display unit 230 suitable for long-term wear are incapable of rendering artificial reality scenes from 3D models comprising polygons with suitable lighting at 60 frames per second, let alone the 200 or more necessary for an immersive experience.

One solution to this problem involves a powerful primary rendering component 220 performing the complex graphics generation work needed to generate surfaces at around 60 frames per second. A display engine 250 of a head-mounted display unit 230 may comprise hardware components powerful enough to adjust or re-sampling what the primary rendering component 220 produces based on a user's movements between updates from the primary rendering component 220. The display engine 250 may rapidly respond to perspective changes created by a user's movement to reprocess the output of the primary rendering component 220, warping or otherwise adjusting the output of the primary rendering component 220 until the primary rendering component 220 has prepared another frame for display. For example, the primary rendering component 220, as described, may render 2D images of virtual objects in a 3D scene at typical rates, e.g., around sixty frames per second. The 2D images may be used to generate surfaces. Each surface may comprise location information that indicates the surface's 3D location relative to the viewer and texture information for the virtual objects they represent, including the results of complex lighting effects, occlusion determination, and implementation of other rendering techniques performed by the primary rendering component 220. The primary rendering component 220 may send the surfaces to the display engine 250. The display engine 250 may then use updated information about, e.g., the position and/or orientation of the user to re-sample the surfaces from the current user perspective and warp the surface to accommodate characteristics of the display. The simplified geometries of the scene (due to the use of surfaces), along with other optimization techniques, enable the display engine 250 to perform the task of refining and rendering the artificial scene at the desired target rates (e.g., at more than 200 frames per second). Thus, while the primary rendering component 220 prepares surfaces that are precise to a user's movements once every $\frac{1}{60}$th of a second, the display engine 250 may re-sample the output to refine the position of graphic every $\frac{1}{200}$th of a second, filling in the gaps created by the frame rate of the primary rendering component 220. This may create a high quality artificial reality experience for the user with smooth and seamless movement of computer generated graphics, while still providing comfortable equipment.

Another solution to this problem involves a compression technique that jointly encodes color components of the surfaces or 2D images (e.g., red, blue, green color channels), which is referenced herein as the joint-color mode. Typically, pixels are associated with three dimensions, or channels, of colors (e.g., red, blue, green color channels). As discussed with additional details below, the joint-color mode encodes the three channels of colors together if there is strong RGB color correspondences between pixels in a pixel block. If not, the pixels color values are encoded separately using standard encoding techniques. As illustrated in FIG. 2, t-encoder 243 of the HMD 230 encodes the surfaces based on either joint-color mode or standard mode depending on the color correspondences. The encoded data is stored in the t-memory 245 residing within the display engine 250 of the HMD 230. When the color information for a particular surface is needed, the GPU compositor 252 accesses the decoded pixel values from t-decoder 248 which access the compressed data from t-memory 245.

Yet another solution to this problem involves a compression technique referred to as the adaptive range packing technique that uses two-dimensional arrays of values to represent various types of data such as those corresponding to image colors, depth, or motion. Similar to the joint-color mode described herein, if the data corresponds to image colors, the data may be encoded, or compressed, by the t-encoder 243 illustrated in FIG. 2, then stored in t-memory 245. For a different type of data, the same, or different, encoder may encode the data and store the encoded data in a memory that is accessible by a system component appropriate for handling that type of data.

Figure 3:
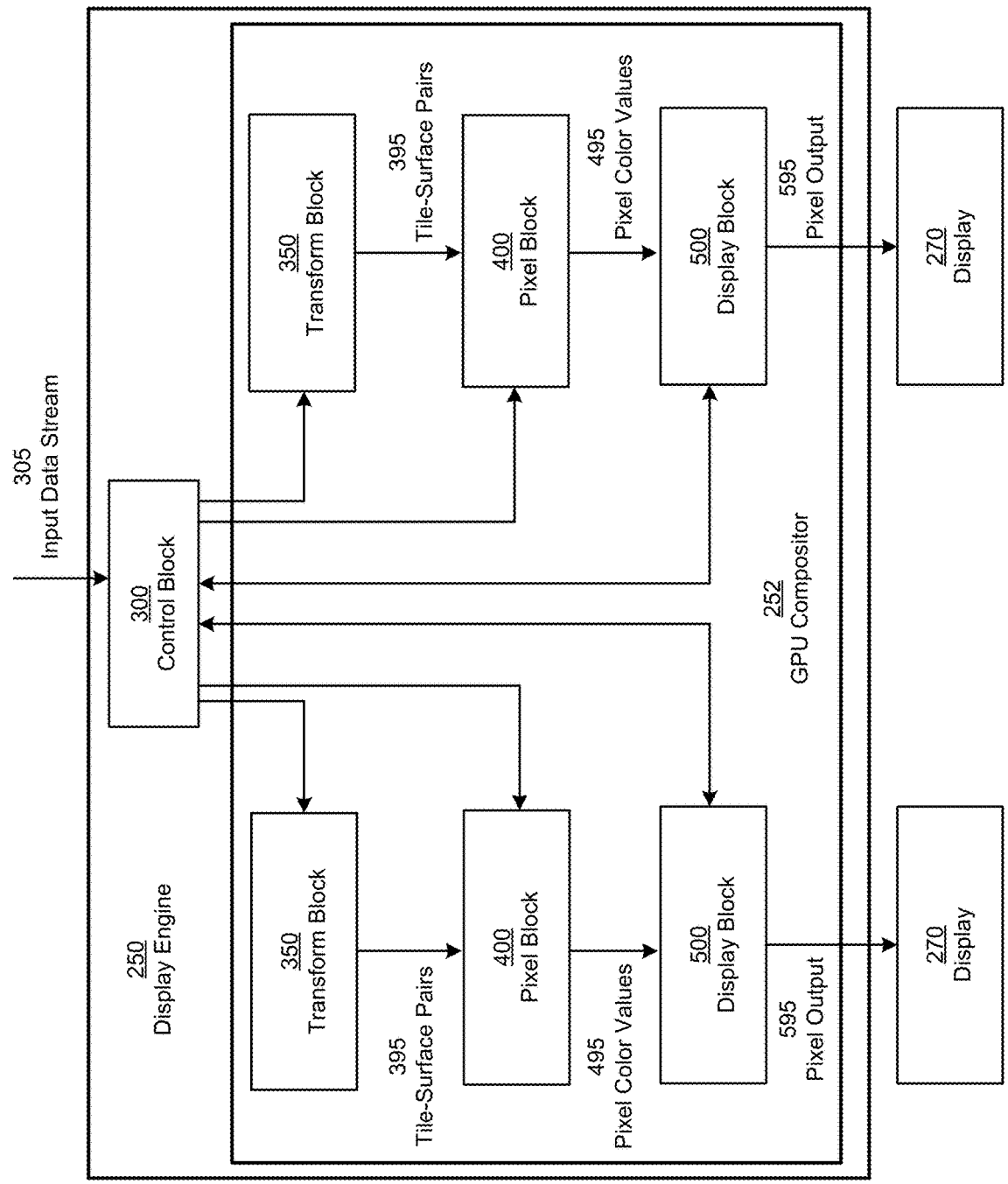
FIG. 3 illustrates a system diagram for a display engine

FIG. 3 illustrates a system diagram for a display engine 250. The display engine 250 may comprise four types of top level blocks. As shown in FIG. 2, these blocks may include a control block 300, transform blocks 350, pixel blocks 400, and display blocks 500. One or more of the components of the display engine 250 may be configured to communicate via one or more high-speed bus, shared memory, or any other suitable method. As shown in FIG. 2, the control block 300 of display engine 250 may be configured to communicate with the transform blocks 350, pixel blocks 400, and display blocks 500, of two mirrored pipelines. In particular embodiments, each pipeline of display engine 250 may be dedicated to preparing images for a separate display 270 to display. Each display 270 may be configured to display images to a user's left and right eye respectively. As explained in further detail herein, this communication may include data as well as control signals, interrupts and other instructions. The two pipelines may be capable of operating independently of the other.

In particular embodiments, the control block 300 may receive an input data stream 305 from the primary rendering component 220 and initialize a pipeline in the display engine 250 to finalize the rendering for display. In particular embodiments, the input data stream 305 may comprise data and control packets from the primary rendering component 220. The data and control packets may include information such as one or more surfaces comprising texture data and position data and additional rendering instructions. The control block 300 may distribute data as needed to one or more other blocks of the GPU Compositor 252. The control block 300 may initiate pipeline processing for one or more frames to be displayed. In particular embodiments, head-mounted display unit 230 may comprise multiple display engines 150 and each may comprise its own control block 300.

In particular embodiments, transform blocks 350 may determine initial visibility information for surfaces to be displayed in the artificial reality scene. In general, transform blocks 350 may cast rays from pixel locations on the display and produce filter commands (e.g., filtering based on bilinear or other types of interpolation techniques) to send to the pixel blocks 400. Transform blocks 300 may perform ray-casting from the current viewpoint of the user (e.g., determined using inertial measurement units, eye trackers, and/or any suitable tracking/localization algorithms, such as simultaneous localization and mapping (SLAM)) into the artificial scene where surfaces are positioned and may produce results to send to the pixel block 400.

In general, transform blocks 350 may each comprise a four-stage pipeline, in accordance with particular embodiments. The stages of a transform block 350 may proceeds as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the displays 270 of the head-mounted display 230. Transform blocks 300 may determine whether each ray bundle intersects with surfaces in the scene by comparing a bounding box of each tile to bounding boxes for each surface. If a ray bundle does not intersect with a surface, it may be discarded. Tile-surface intersections are detected, and corresponding tile-surface pairs 395 are passed to the pixel blocks 400.

In general, pixel blocks 400 determine color values from the tile-surface pairs 395 to produce pixel color values, in accordance with particular embodiments. The color values for each pixel are sampled from the texture data of surfaces received and stored by the control block 300 (e.g., as part of input data stream 305). Pixel blocks 400 receive tile-surface pairs 395 from transform blocks 350 and schedule bilinear filtering. For each tile-surface pair 395, pixel blocks 400 may sample color information for the pixels within the tile using color values corresponding to where the projected tile intersects the surface. In particular embodiments, pixel blocks 400 may process the red, green, and blue color components separately for each pixel. Pixel blocks 400 may then output pixel color values 495 to the display blocks 500.

In general, display blocks 500 may receive pixel color values 495 from pixel blocks 400, convert the format of the data to be more suitable for the scanline output of the display, apply one or more brightness corrections to the pixel color values 495, and prepare the pixel color values 495 for output to the displays 270. Display blocks 500 may convert tile-order pixel color values 495 generated by pixel blocks 400 into scanline- or row-order data, which may be required by the displays 270. The brightness corrections may include any required brightness correction, gamma mapping, and dithering. Display blocks 500 may provide pixel output 595, such as the corrected pixel color values, directly to the displays 270 or may provide the pixel output 595 to a block external to the display engine 250 in a variety of formats. For example, the head-mounted display unit 230 may comprise additional hardware or software to further customize back-end color processing, to support a wider interface to the display, or to optimize display speed or fidelity.

In particular embodiments, the control block 300 may receive an input data stream 305 from the primary rendering component 220 and initialize a pipeline in the display engine 250 to re-sample or correct artificial reality surfaces based on the user's current viewpoint. In particular embodiments, the control block 300 may receive control packets from the primary rendering component 220. The control packets may include one or more surfaces with texture data and position data (e.g., as defined by transformation matrices) to be rendered in the artificial reality scene.

Particular embodiments disclosed herein are directed to image compression techniques that leverage strong RGB color correspondences between pixels in a pixel block. Conventional compression techniques are typically asynchronous, thus are too slow to allow real-time encoding and decoding. To allow images to be encoded/decoded faster, embodiments of this disclosure provide a method of selectively encoding certain pixel blocks of an image based on the concept of Principal Component Analysis if the color values within the block are highly correlated to each other. The high-level idea is that, if pixel color values within a block are highly correlated to each other, the color values for the entire block can be encoded into a simplified representation that captures most of the color information. This technique, referred to as the joint-color mode, can be selectively applied to certain pixel blocks in an image if the block is suitable for the joint-color mode (e.g., high correlation of pixel color values), while other blocks of the image are encoded using the standard encoding method (normal mode).

Principal Component Analysis (PCA) is a method used to reduce the dimensionality of large data sets, by transforming a large set of variables into a smaller one that still contains most of the information in the large set. This method involves transforming multi-dimensional dataset into pairs of eigenvector and eigenvalue, each pair representing one dimension of the data set. An eigenvector, also referred to as the principal component, is a characteristic vector that represents a new dimension or a new axes of the data set, or said differently, a line or a direction representing values of the data set that are associated with the highest variance (most information). An eigenvalue is a scaling coefficient attached to the corresponding eigenvector and represents the amount of variance carried in each principal component. When transforming a data set based on eigenvectors and eigenvalues, the number of dimensions represented by the eigenvectors and eigenvalues match the number of dimensions of the data set. Thus, for example, in the context of RGB colors, representing the dataset based on PCA would produce three pairs of eigenvector and eigenvalue, since there are three channels, or dimensions, of colors (e.g., red, blue, green channels). In reference to eigenvectors and eigenvalues, determining whether to encode a pixel block based on the joint-color mode involves determining that the RGB color values of the pixel block have sufficiently strong correspondences such that one pair of eigenvector and eigenvalue can represent most of the color information of the pixel block. Thus, encoding the pixel block based on the joint-color mode means that the RGB color values of the pixel block are encoded as a single-dimensional data set represented by the line corresponding to a dominant eigenvector.

Figure 4:
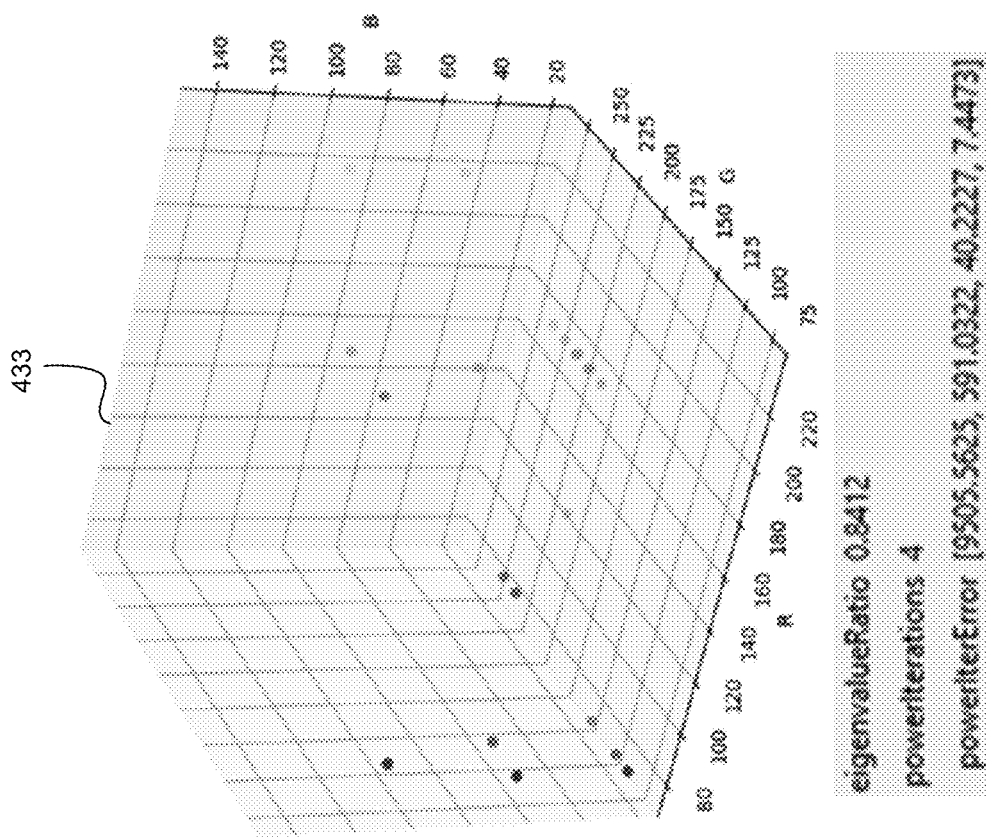
FIG. 4 illustrates pixel color values of pixel blocks.
Figure 4:
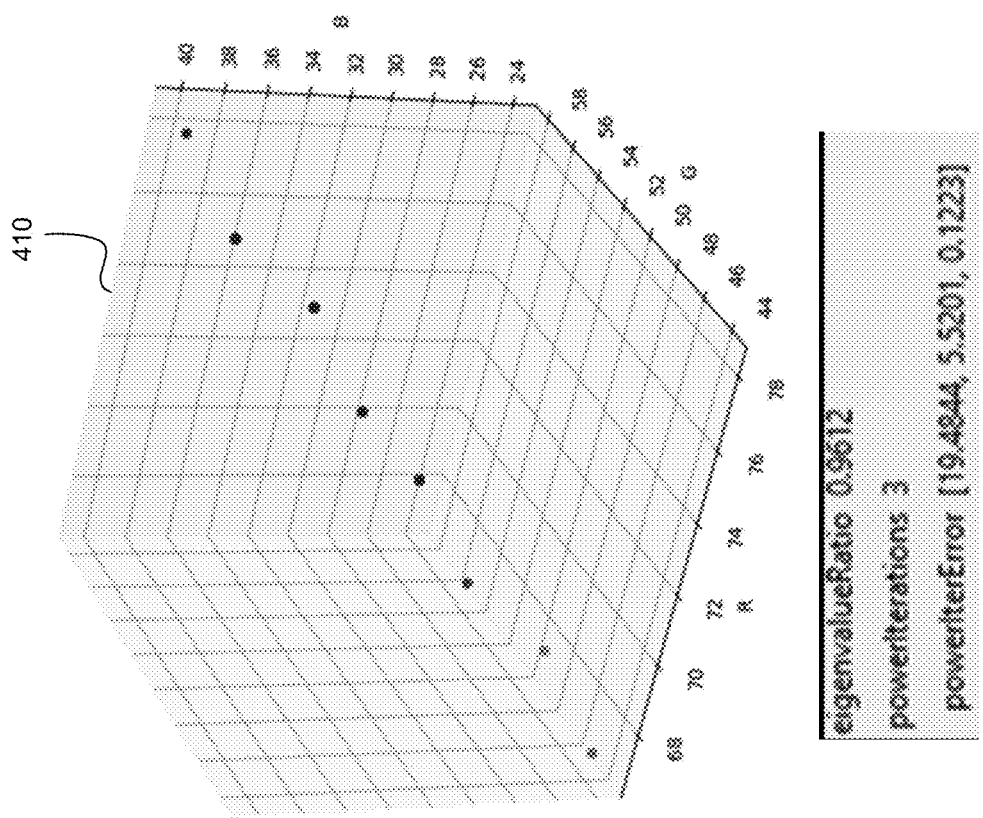

The disclosed embodiments provide techniques for jointly encoding RGB color values of certain pixel blocks if there are strong color correspondences between the RGB colors of a pixel block. In particular embodiments, determining whether to encode the pixel block using the joint-color mode involves calculating the largest eigenvalue and eigenvector for the pixel color values within a pixel block and determining whether the largest eigenvalue is significantly bigger than the other eigenvalues (indicating dominance over the other eigenvalues). In one method, the power iteration technique may be used to determine the largest eigenvalue and eigenvector for the pixel color values in a pixel block. The power iteration technique involves iteratively performing the steps of approximating an arbitrary starting vector $v_i$, multiplying the vector $v_i$ by matrix A (e.g., 3×3 co-variance matrix for RGB color values of the pixel), then normalizing the resulting vector $v_j$ based on the largest entry n of the resulting vector. These steps may be performed iteratively for a predetermined number of iterations (e.g., four iterations), then the resulting vector $v_j$ may be checked to see if it has converged into the eigenvector corresponding to the largest eigenvalue, which may be indicated by the largest entry n corresponding to the resulting vector $v_j$ (e.g., the eigenvector). If it has, then the dominance of the largest eigenvalue may be determined by comparing it to the other eigenvalues (e.g., based on the ratio between the largest eigenvalue and the sum of all eigenvalues). If the largest eigenvalue is sufficiently dominant (e.g., if the ratio is higher than a threshold ratio), the color channels of the pixel block may be jointly encoded using the joint-color mode; otherwise, the color channels of the pixel block may be encoded separately. For example, referring to the coordinate system 410 in FIG. 4, the color values of a pixel block are illustrated as having strong color correspondences such that a line drawn through the pixels could be used to represent the distribution of the pixel values in the dataset. This line could be represented by an eigenvector, and the eigenvalue corresponding to the eigenvector may be determined as being dominant in part due to the eigenvalue having a high ratio value of, for example, 0.9612, when compared to the sum of all eigenvalues. As a counter-example, referring to the coordinate system 433, the color values of a different pixel block are illustrated as having weak color correspondences such that a line drawn through the pixels would not be able to accurately represent the distribution of the pixel values in the dataset. Thus, an eigenvalue corresponding to the line may not be determined as being dominant in part due to the eigenvalue having a ratio value that is, when compared to the other eigenvectors, lower than a predetermined threshold (e.g., 0.8412). In particular embodiments, the threshold ratio value for the eigenvalue may be predetermined based on the type of data set (e.g., 0.96 threshold ratio for type of data corresponding to RGB values). In particular embodiments, determining the dominance of the eigenvalue may involve using other techniques such as: inverse iteration, Rayleigh quotient iteration, preconditioned inverse iteration, etc.

Figure 5:
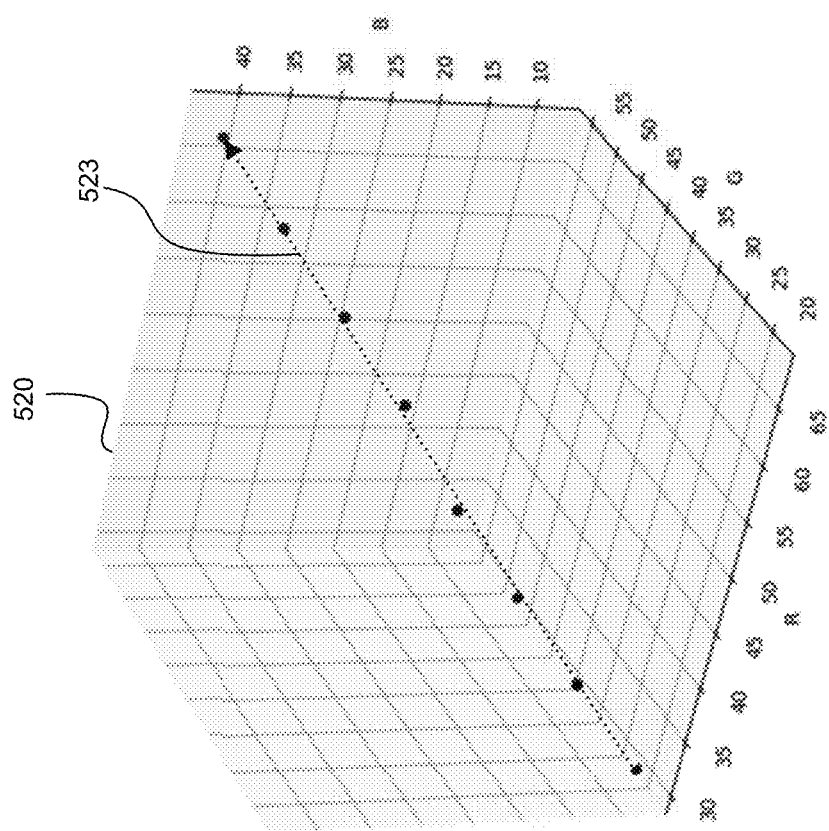
FIG. 5 illustrates pixel color values of pixel blocks.
Figure 5:
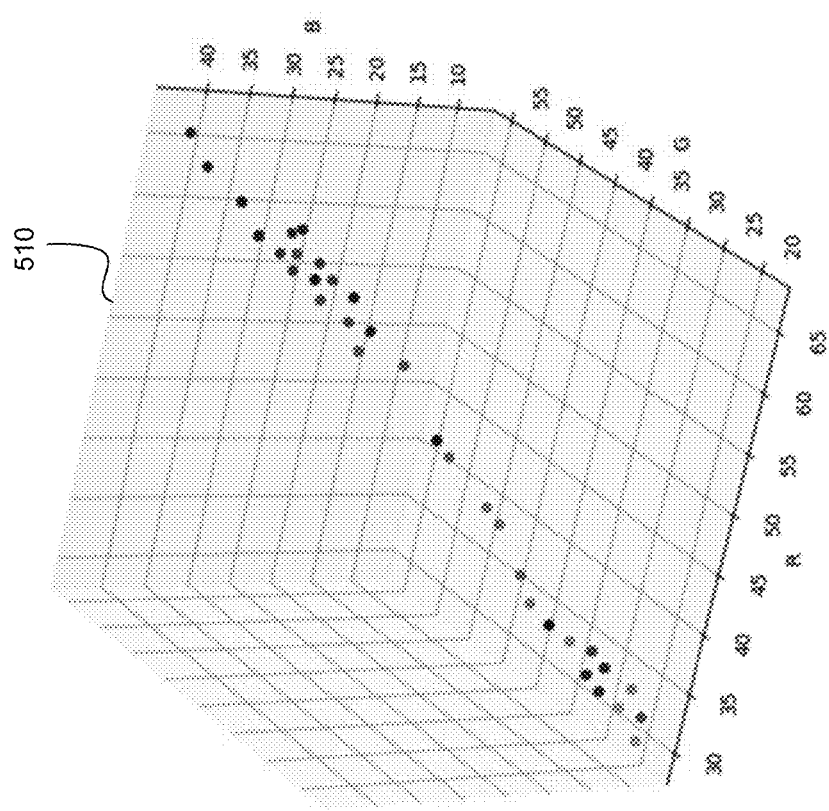

In particular embodiments, if a pixel block is to be encoded using the joint-color mode, the encoding process may involve dividing the line corresponding to the dominant eigenvector (i.e., principal component) into bins based on the minimum and maximum color values of the pixel block and a particular number of bits assigned to the encoding process. Then, each pixel in the pixel block (e.g., in the three-dimensional RGB coordinate space) may be projected onto the line and encoded based on the bin that the projection falls into. Each bin is associated with a single quantized value falling on the single-dimensional line corresponding to the dominant eigenvector. For example, referring to the coordinate system 510 in FIG. 5, the color values of a pixel block are illustrated as having strong color correspondences such that a line drawn through the pixels (e.g., dominant eigenvector) sufficiently represents the distribution of the pixel color values in the dataset. In the embodiment illustrated in FIG. 5, the encoding process is assigned 3 binary bits to represent the bins, thus, as illustrated in the coordinate system 520, the line is divided into 8 bins since 3 bits are able to represent 8 different values. The first bin is illustrated as corresponding the minimum value of the pixel values in the pixel block (e.g., minimum pixel value [32, 22, 12]), and the last bin is illustrated as corresponding to the maximum value of the pixel values in the pixel block (e.g., maximum pixel value [66, 53, 42]). In particular embodiments, the number of bits assigned to the encoding process may be determined based on the range of the pixel values corresponding to a particular color channel. For example, if the range of red pixel values in the block is 20 (e.g., minimum pixel value of 100; maximum pixel value of 120), the pixels may be encoded using 5 bits since 5 bits are able to represent 32 different values. In some embodiments, the number of bits assigned to the encoding process may be determined based on the average range of the pixel values corresponding to two or three color channels. In other embodiments, the number of bits assigned to the encoding process may be determined based on a target compression ratio for the pixel block (e.g., 3 bits).

In particular embodiments, the decoding process involves identifying the bin that the pixel was encoded based upon and the associated quantized value of the bin, which corresponds to the one-dimensional coordinate space of the dominant eigenvector, then determining the three-dimensional point in the RGB coordinate space that corresponds to the quantized value of the bin. In some embodiments, the RGB color values corresponding to each bin may be indexed in a look-up table, allowing the RGB color values to be determined based on thereof.

Figure 6:
FIG. 6 illustrates an image being selectively encoded.
Figure 7:
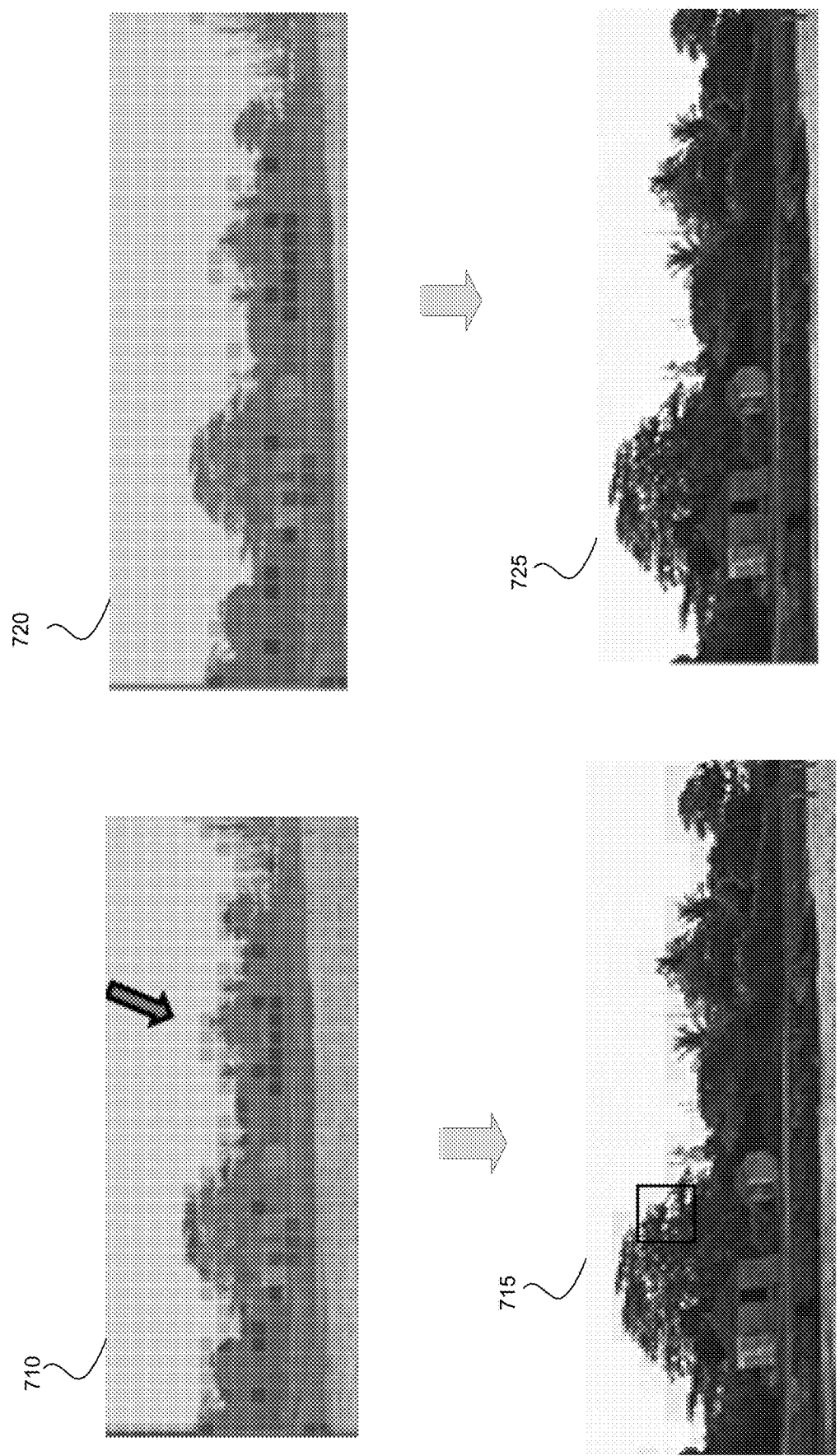
FIG. 7 illustrates images being selectively encoded.

FIG. 6 illustrates an example image comprising a plurality of pixel blocks that are selectively encoded using the joint-color mode. The lighter pixel blocks correspond to blocks with sufficiently high RGB color correspondences, thus may be encoded using the joint-color mode where the color values of the pixels are jointly encoded based on PCA. The darker pixel blocks correspond to blocks without sufficiently high RGB color correspondence, thus may be encoded using a standard encoding mode where the color values for each of the color channels are encoded separately. As discussed above, pixel blocks may be encoded using the joint-color mode if there are strong correspondences between the RGB color values in the pixel block. However, in some embodiment, pixel blocks may not be encoded with the joint-color mode even if the color values of the block are highly correlated to each other, because the joint-color mode may not be able to accurately represent the color information of the block, thereby producing undesirable artifacts when the block is decoded. For example, FIG. 7 illustrates an image 710 comprising darker pixel blocks corresponding to the edges of the trees. Those darker pixels were determined as having sufficiently high RGB color correspondences, thus were encoded using the joint-color mode. However, as it can be seen in the decoded image 715, undesirable artifacts can be seen by the outer-edges of the trees. Such undesirable artifacts may be produced if pixel blocks comprising over-exposed pixels or high-contrast pixels are encoded using the joint-color mode. Examples of high-contrast pixels are shown in the image 715 (e.g., the edges of the trees indicated by the illustrated box). Thus, in particular embodiments, even if the color values of the block are highly correlated to each other, certain pixel blocks may be encoded using the standard encoding mode, for example, if the color range of the pixels is greater than a threshold value (to detect high-contrast edges) or if there are a group of over-exposed pixels (e.g., a group of pixels with value of pixel value 255). A demonstration of this technique is illustrated in images 720 and 725 where the edges of the trees do not display any undesirable artifacts.

Now being described is a compression technique referred to as the adaptive range packing technique which involves compressing various types of pixel data into two-dimensional arrays of values. For example, the adaptive range packing technique may be used to compress types of data corresponding to image colors, depth, and motion or optical flow. In particular embodiments, the adaptive range packing technique aims to compress pixel data by a constant rate, such that the amount of compression resulting from the technique results in, on average, a predictable and substantially constant rate. In some embodiments, the adaptive range packing technique may involve variable rate compression.

In particular embodiments, an image may be partitioned into a plurality of blocks, each block comprising a plurality of pixels. Depending on the type of data associated with the image, each pixel may have multiple components or channels. For example, if the type of data corresponds to color values, each pixel may be associated with a number of components such as the red, blue, and green components for RGB colors, Cb and Cr components for chrominance, or Y component for luminance. If the type of data corresponds to motion, each pixel may be associated with components corresponding to motion vector/field or optical flow vector/field. If the type of data corresponds to depth, each pixel may be associated with a depth component (e.g., z value). The adaptive range packing technique described herein, while capable of encoding the various pixel components, such as those described above, each component is encoded separately.

Figure 8A:
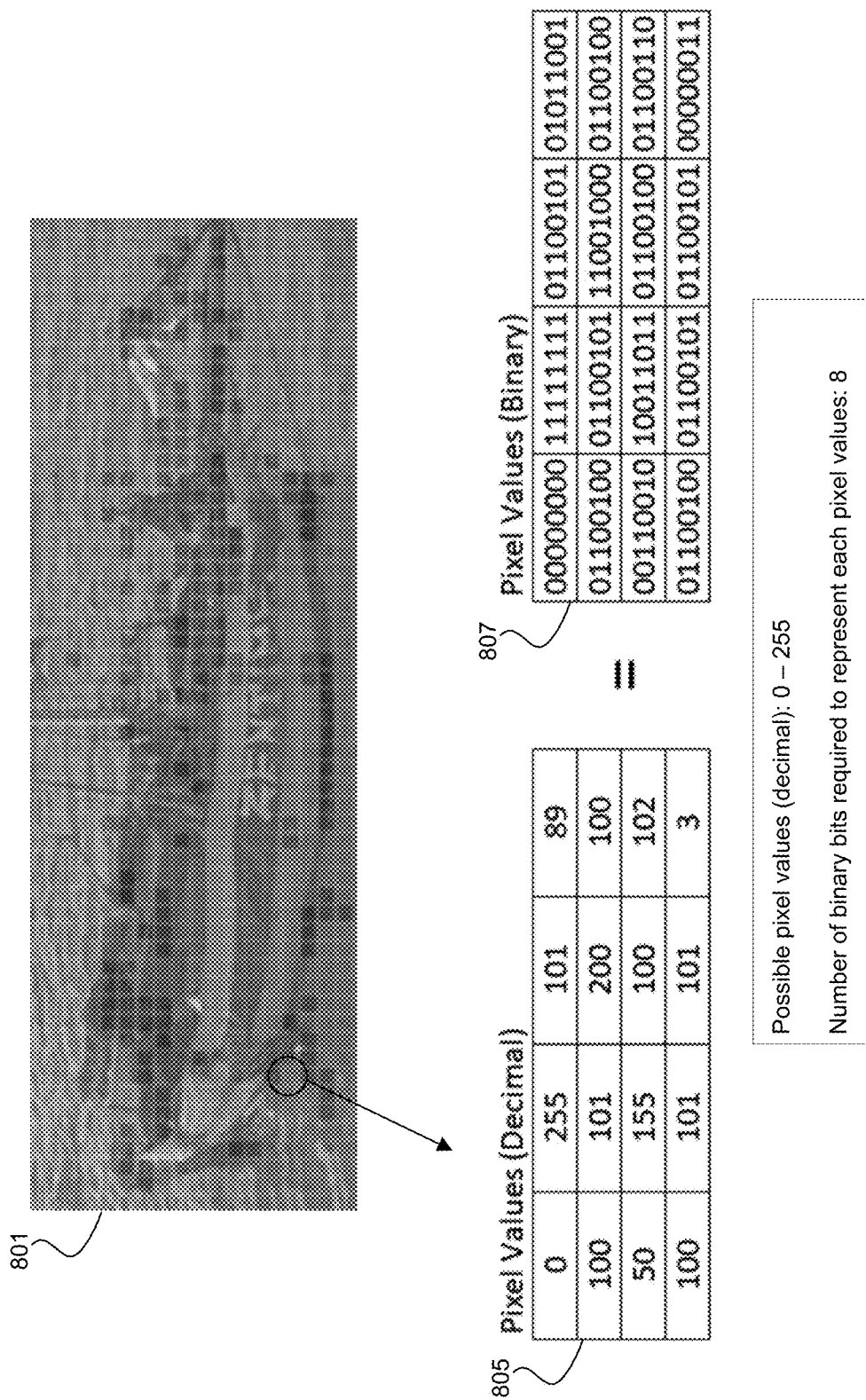
FIGS. 8A-8C illustrate examples of uncompressed pixel arrays and compressed pixel arrays.
Figure 8B:
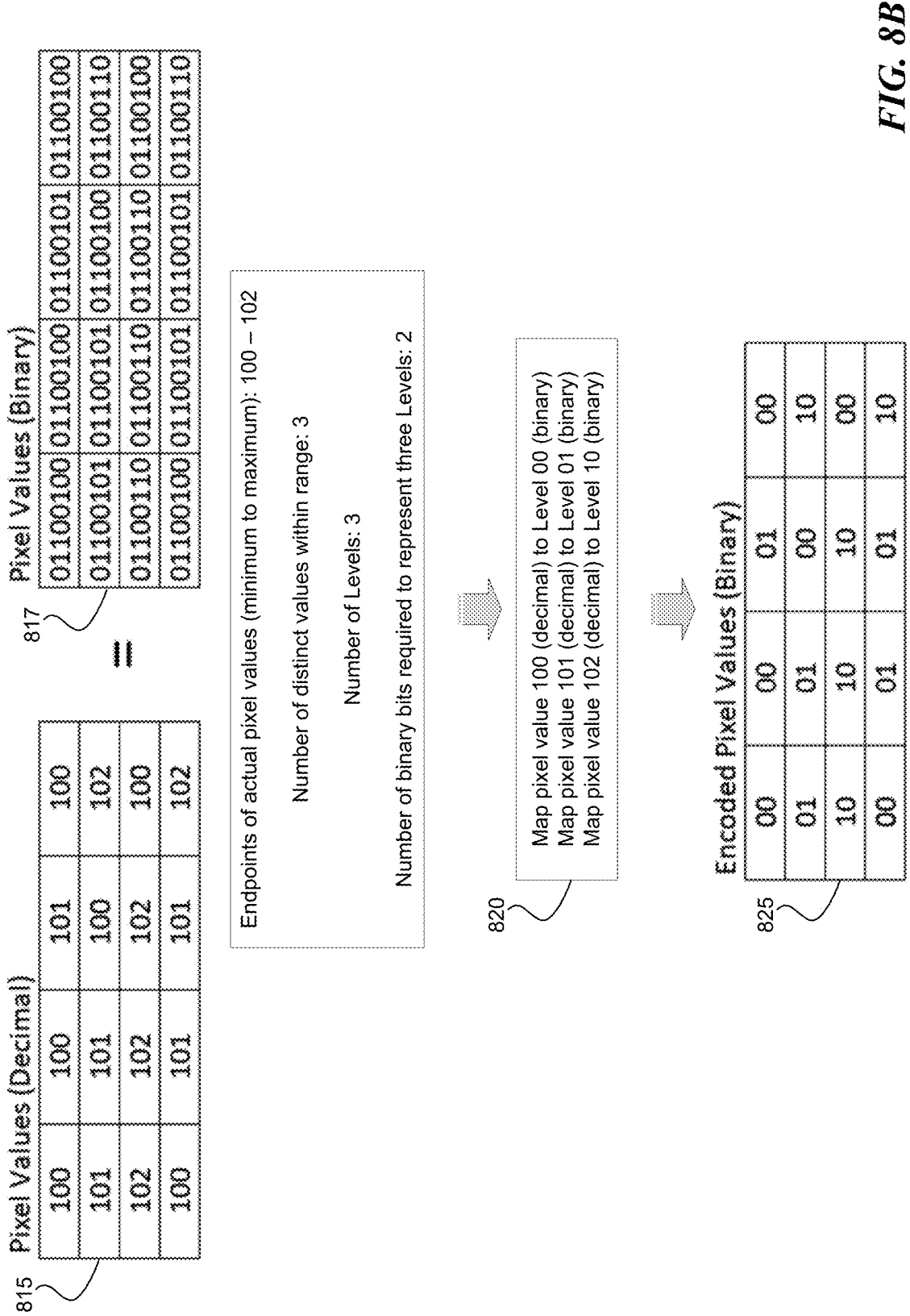
Figure 8C:

FIGS. 8A-8C illustrate diagrams and data arrays demonstrating the adaptive range packing technique of this disclosure. As illustrated in FIG. 8A, an image 801 may be partitioned into a plurality of pixel blocks (e.g., pixel arrays) of a particular size. In particular embodiments, the size of the pixel block may be determined based on the variance of the pixel values in the block (e.g., 4×4, 16×16, etc.). The compression ratio resulting from the adaptive range packing technique improves as the variance of the pixel values decreases. Thus, if an image is associated with high variance of pixel values, the image may be partitioned into smaller pixel blocks to reduce the variance contained in each pixel block, thereby improving the compression ratio. Alternatively, if the image is associated with low variance of pixel values, the image may be partitioned into bigger pixel blocks to improve the compression ratio. While the embodiments illustrated in FIGS. 8A-8C show examples of 4×4 pixel arrays, this disclosure contemplates any size of pixel arrays that is suitable for improving the compression ratio.

FIG. 8A illustrates an example of uncompressed pixel arrays 805 and 807 that may be representative of the pixel values of a block of a particular image (e.g., image 801). Typically, the pixel range of the RGB color values corresponds to the minimum value of 0 and the maximum value of 255 (e.g., 256 total color values), which may be represented by 8 binary bits. For example, the pixel array 805 shows sixteen pixel values ranging from 0 to 255. The pixel array 807 shows binary representations of pixel values shown in the pixel array 805.

FIG. 8B illustrates example pixel arrays demonstrating the lossless variation of the adaptive range packing technique. The adaptive range packing technique leverages the similarities between the pixel values within a pixel block to represent the pixel values with reduced number of binary bits. The technique involves determining the range of the pixel values in a block and the endpoints of the pixel values, then determining the quantization levels to represent the values within the pixel range. In some embodiments, the adaptive range packing technique compresses a pixel block in a lossless fashion such that each distinct value within the pixel range is represented by a quantization level. For example, in reference to the pixel array 815, given that there are three distinct pixel values (i.e., 100, 101, 102), three quantization levels are assigned, one for each distinct pixel value, as shown in the table 820. Converting each pixel value in the pixel array 815 based on the table 820 involves mapping each pixel values to their corresponding quantization level, which results in the compressed pixel array 825. This allows each of the pixel values to be represented by 2 binary bits instead of the 8 binary bits shown in the uncompressed pixel array 817. In accordance to some embodiments, the decoding process involves adding the encoded pixel values to the minimum pixel value of the uncompressed pixel array (e.g., pixel array 815).

FIG. 8C illustrates example pixel arrays demonstrating the lossy variation of the adaptive range packing technique. In some embodiments, the adaptive range packing technique may compress the pixel block in a lossy fashion such that each quantization level represents a group of discrete values. In contrast to the lossless variation, the number of quantization levels representing the values within the pixel range is less than the number of discrete values within the pixel range. In such embodiments, the number of quantization levels may be predetermined prior to the encoding process, or alternatively, dynamically calculated to ensure that the image, or each individual pixel block within the image, is compressed at a particular compression ratio. In reference to the pixel array 835, eight levels have been assigned to represent forty distinct pixel values, each level representing five distinct pixel values, as indicated by the scale value of 5. This allows each of the pixel values in the pixel array 835 to be represented by one of the eight assigned levels, in accordance to the table 820. Pixel values that are encoded based on the table 820 are shown in the encoded pixel array 845. As shown in the pixel array 845, each pixel value is represented by 3 binary bits instead of the 8 binary bits shown in the uncompressed pixel array 837. In accordance to some embodiments, the decoding process involves multiplying the encoded pixel values by the scale then adding them to the minimum pixel value of the uncompressed pixel array (e.g., pixel array 835).

In particular embodiments, where the number of the quantization levels assigned to a pixel block corresponds an uneven number, multiple pixel values may be grouped together and represented by a longer bit string to better utilize the bits. For example, referring to the table 820 in FIG. 8B, pixel range of three (e.g., three distinct values of the pixels), or three quantization levels, are represented by two binary bits. However, each of the two bits are under-utilized since two bits being are being used to represent three values when they are capable of representing four values. In such embodiments, multiple pixel values may be grouped together and represented by a longer bit string based on the unique combination resulting from grouping of the pixel values. For example, referring back to FIG. 8B, if five pixel values are grouped together, given that the number of levels assigned to each pixel value is three (e.g., three distinct values, or the range of pixel values being three), there would be 243 possible combinations of values resulting from the grouping of the pixel values (e.g., $3*3*3*3*3=3^5=243$). These unique combination of values could be represented by 8 binary bits since 8 bits are capable of representing 256 different values. Therefore, each grouping of five pixel values in the pixel array 825 (e.g., [00, 00, 01, 00, 01]) can be classified based on the unique combination of the pixel values and mapped to an 8 binary bit value representing the unique combination. This means that the pixel array 825, which comprises 16 pixel values represented by 32 binary bits, could be compressed even further by utilizing three 8 binary bit strings to represent 15 pixel values and one additional 2 binary bit string to represent the last pixel value, totaling the use of 26 binary bits to represent 16 pixel values. Similar approach could be employed whenever the range of pixel values can be factored into powers of 2, 3, or 5. For example, if the range is 9, which can be factored as $3*3$, then each pixel value can be represented by two base-3 digits. The number of bits required to represent 16 pixel values, X, can be solved by the equation $X=A*3+B$, where A and B are each one of base-3 digits: $\{0,1,2\}$. Given that $A=X/3$ has a range of 3 and $B=X-A*3$ also has a range of 3, each of the 16 values of A and B can be encoded into 26 bits. Then, the total number of bits required to represent 16 pixel values, with the pixel range of 9, can be solved as 52 bits. If the range is 45, which can be factored as $3*3*5$, then the number of bits required to represent 16 pixel values, X, can be solved by the equation $X=5*AB+C$, where A and B are each one of base-3 digits and C is a base-5 digit. Three different C values could be represented in 7 bits since there would be 125 possible combinations of values resulting from the grouping of the pixel values (e.g., $5*5*5=5^3=125$), which is less than the 128 values represented by 7 binary bits. Five of these 7-bit strings could represent 15 of the of the 16 total pixel values, and the last pixel value could be represented by 3 bits, meaning C value in the equation can be solved to 38 bits (e.g., five 7-bit string with 3 additional bits). From the above example, AB was determined as requiring 52 bits, which can be added to the 38 bits required for the C value, resulting in 90 bits for X, which represents the total number of bits required to represent 16 pixel values with the pixel range of 45.

Figure 9:
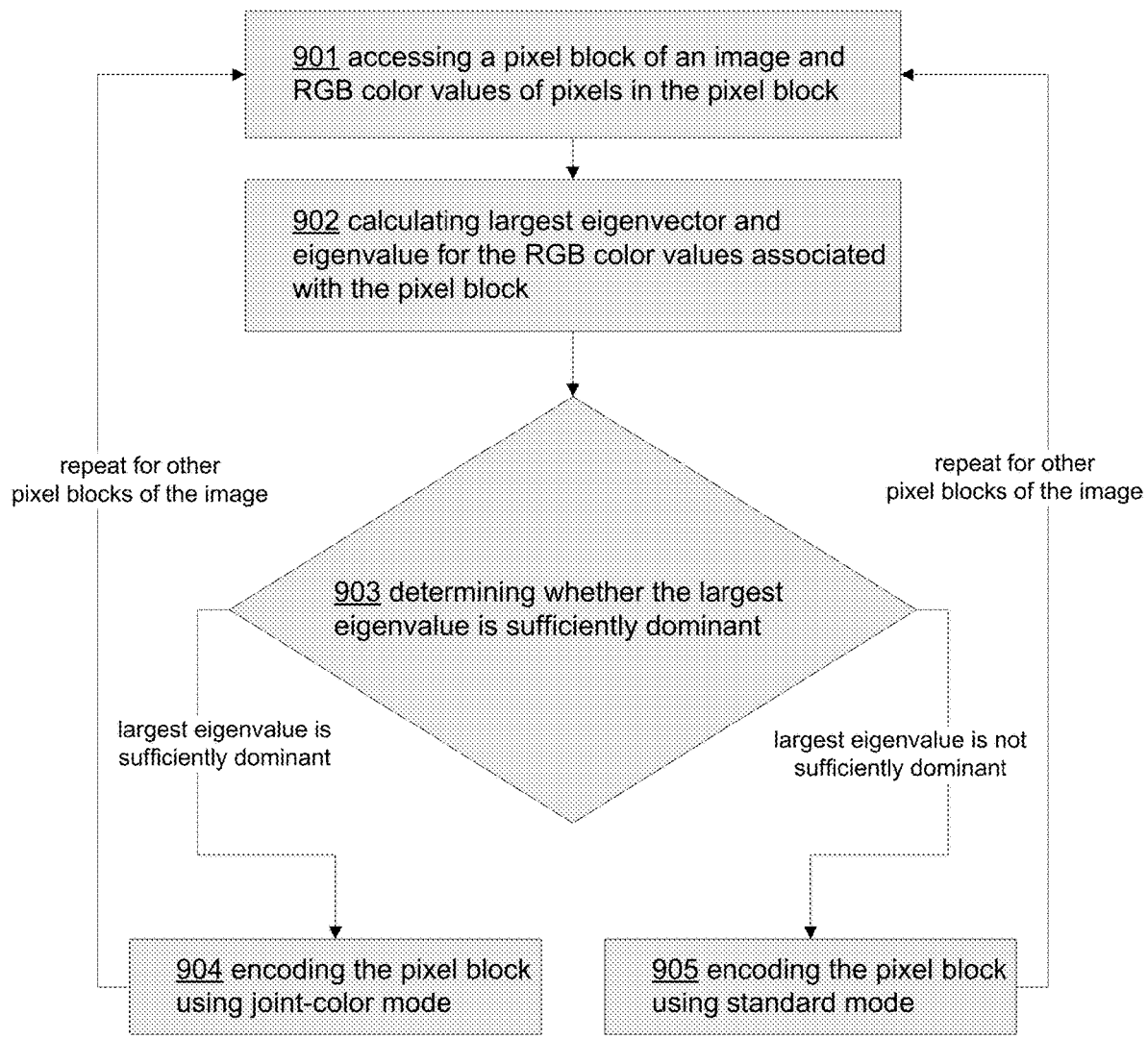
FIG. 9 is a flow diagram of a method for selectively encoding pixel blocks of an image based on joint-color mode.

FIG. 9 illustrates an example method 900 for selectively encoding pixel blocks of an image based on joint-color mode. The method may begin at step 901 by accessing a pixel block of an image and RGB color values of the pixels in the pixel block. At step 902, the method may continue by calculating the largest eigenvectors and eigenvalues for the RGB color values associated with the pixel block. At step 903, the method may continue by determining whether the largest eigenvalue is sufficiently dominant. If the largest eigenvalue is sufficiently dominant, at step 904, the method may continue by encoding the pixel block using joint-color mode. If the largest eigenvalue is not sufficiently dominant, at step 905, the method may continue by encoding the pixel block using standard mode. Then, the method 900 may repeat for other pixel blocks of the image until all of the pixel blocks of the image are encoded either by the joint-color mode or the standard mode. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for selectively encoding pixel blocks of an image based on joint-color mode, this disclosure contemplates any suitable method for selectively encoding pixel blocks of an image based on joint-color mode including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
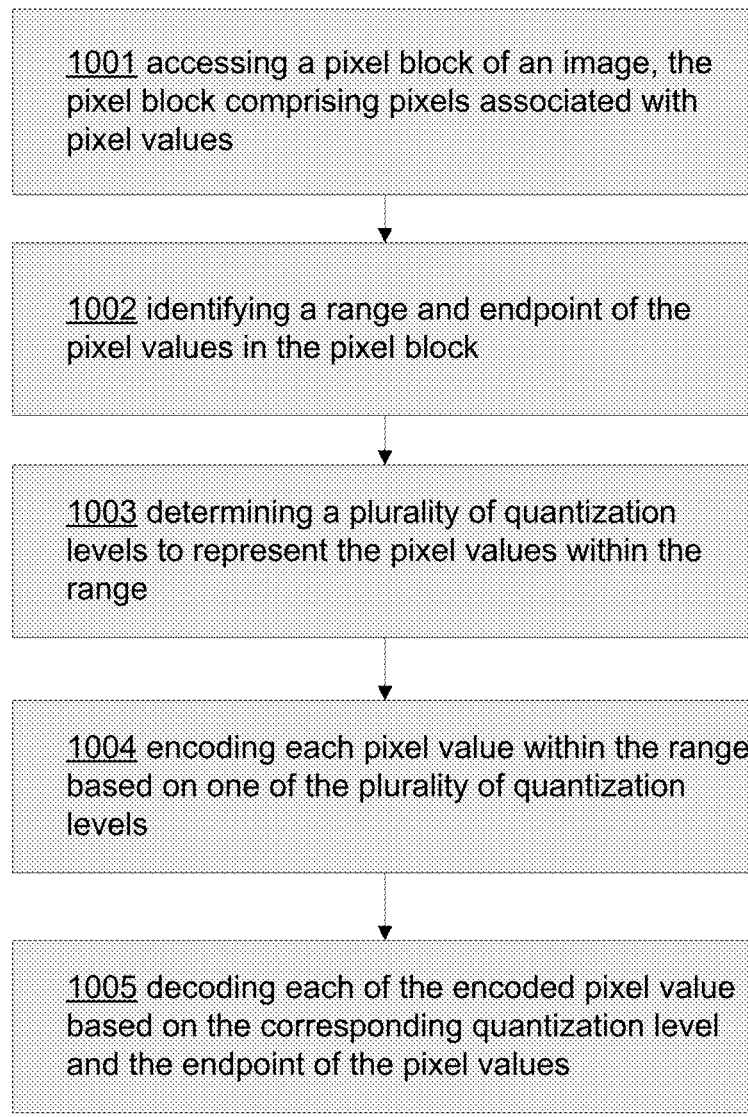
FIG. 10 is a flow diagram of a method for compressing pixel arrays based on quantization levels.

FIG. 10 illustrates an example method 1000 for compressing and decompressing pixel arrays based on quantization levels. The method may begin at step 1001 by accessing a pixel block of an image, the pixel block comprising pixels associated with pixel values. At step 1002, the method may continue by identifying a range and endpoint of the pixel values in the pixel block. At step 1003, the method may continue by determining a plurality of quantization levels to represent the pixel values within the range. At step 1004, the method may continue by encoding each pixel value within the range based on one of the plurality of quantization levels. At step 1005, the method 1000 may also include the steps of decompressing the pixel array by decoding each of the encoded pixel value based on the corresponding quantization level and the endpoint of the pixel values. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for compressing and decompressing pixel arrays based on quantization levels, this disclosure contemplates any suitable method for compressing and decompressing pixel arrays based on quantization levels including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
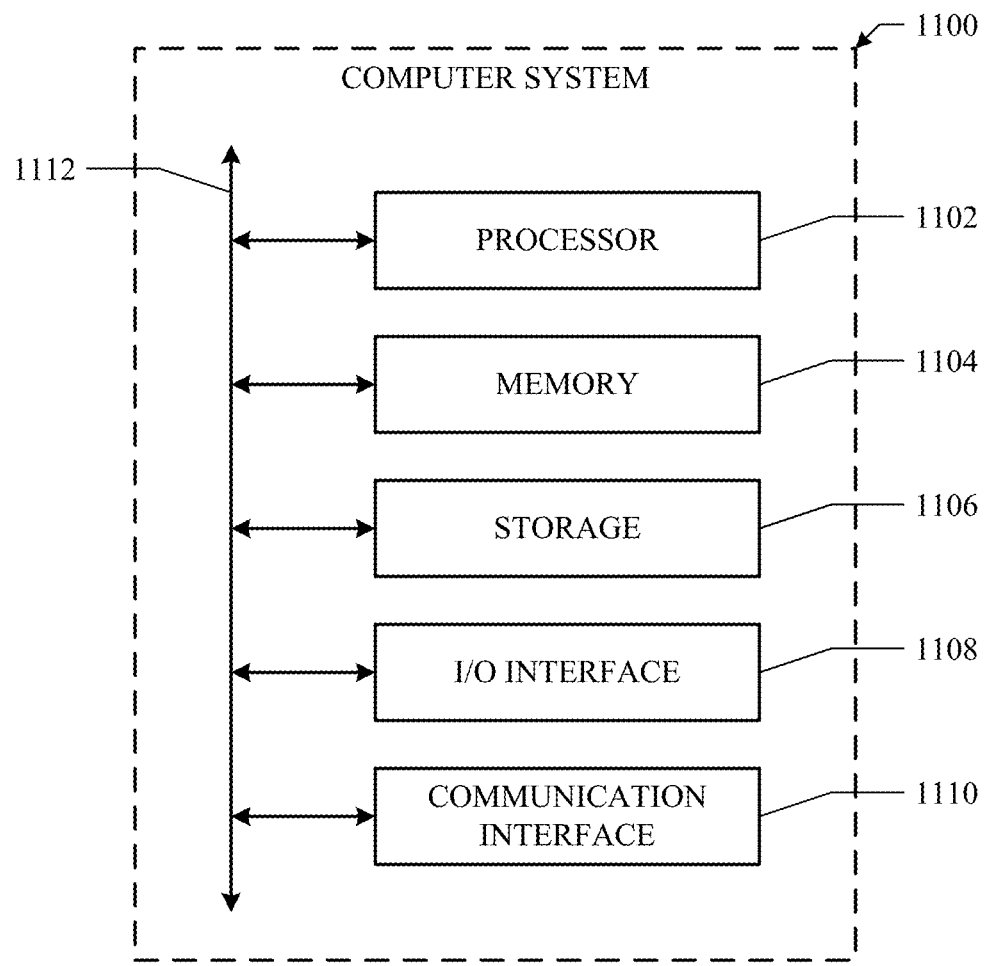
FIG. 11 illustrates an example computer system.

FIG. 11 illustrates an example computer system 1100 that may be useful in performing one or more of the foregoing techniques as presently disclosed herein. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein.

As an example, and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate. In certain embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In certain embodiments, processor 1102 includes hardware for executing instructions, such as those making up a computer program. As an example, and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example, and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102.

Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 602. Although this disclosure describes and illustrates a particular processor, this disclosure contemplates any suitable processor.

In certain embodiments, memory 1104 includes main memory for storing instructions for processor 1102 to execute or data for processor 1102 to operate on. As an example, and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere).

One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example, and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In certain embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In certain embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In certain embodiments, communication interface 1110 includes hardware, software, or both providing one or more interfaces for communication (such as, for example, packet-based communication) between computer system 1100 and one or more other computer systems 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it.

As an example, and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In certain embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method implemented by a computing system, the method comprising:
- accessing a first pixel block of an image, the first pixel block comprising pixels that are each associated with three color values;
- determining whether to separately encode or jointly encode the three color values of each of the pixels of the first pixel block;
- determining that the three color values of each of the pixels in the first pixel block are to be jointly encoded based on:
  - determining, based on the three color values of each of the pixels of the first pixel block, a line defined within a three-dimensional coordinate system in which each of the pixels is represented as a three-dimensional point; and
  - determining that the line satisfies one or more predetermined criteria; and
- encoding the three color values of each of the pixels in the first pixel block as a single quantized value based on a projection of the three-dimensional point associated with that pixel onto the line.

2. The method of claim 1, further comprising:
- accessing a second pixel block of an image, the second block comprising pixels that are each associated with three color values;
- determining whether to separately encode or jointly encode the three color values of each of the pixels of the second pixel block;
- determining that the three color values of each of the pixels in the second pixel block are to be separately encoded based on:
  - determining, based on the three color values of each of the pixels of the second pixel block, a line defined within the three-dimensional coordinate system; and
  - determining that the line does not satisfy one or more of the predetermined criteria; and
- encoding the three color values of each of the pixels in the second pixel block separately.

3. The method of claim 1, wherein determining that the line satisfies the one or more predetermined criteria comprises:
- analyzing the three color values of each of the pixels in the first pixel block based on Principal Component Analysis;
- determining, in response to the analyzing, that the line corresponds to a dominant eigenvector and a largest eigenvalue.

4. The method of claim 3, wherein determining that the line corresponds to the dominant eigenvector and the largest eigenvalue is based on a power iteration technique.

5. The method of claim 1, wherein encoding the three color values of each of the pixels in the first pixel block as the single quantized value based on the projection of the three-dimensional point associated with that pixel onto the line comprises:
- partitioning the line into a plurality of bins, each bin being associated with a single quantized value corresponding with a portion of the line;
- for each of the pixels in the first pixel block:
  - projecting the three-dimensional point associated with the pixel onto the line;
  - identifying a bin of the plurality of bins that the projection of the three-dimensional point falls onto; and
  - encoding the three color values of the pixel as the single quantized value corresponding to the identified bin.

6. The method of claim 1, further comprising:
- for each of the pixels in the first pixel block:
  - decoding the encoded three color values of the pixel by determining a three-dimensional point on the three-dimensional coordinate system that corresponds to the single quantized value associated with the projection of the three-dimensional point associated with that pixel on the line.

7. The method of claim 1, wherein determining that the three color values of each of the pixels in the first pixel block are to be jointly encoded is further based on, one or more of:
- determining whether a pixel range associated with each of the three color values of the pixels in the first pixel block are under a threshold value; or
- determining whether a number of the pixels in the first pixel block that are associated over-exposure is less than a threshold number.

8. The method of claim 1, wherein the three color values of each of the pixels of the first pixel block correspond to red, blue, and green colors.

9. A system comprising: one or more processors; and one or more computer-readable non-transitory storage media in communication with the one or more processors, the one or more computer-readable non-transitory storage media comprising instructions that when executed by the one or more processors, cause the system to perform:
- access a first pixel block of an image, the first pixel block comprising pixels that are each associated with three color values;
- determine whether to separately encode or jointly encode the three color values of each of the pixels of the first pixel block;
- determine that the three color values of each of the pixels in the first pixel block are to be jointly encoded based on:
  - determining, based on the three color values of each of the pixels of the first pixel block, a line defined within a three-dimensional coordinate system in which each of the pixels is represented as a three-dimensional point; and
  - determining that the line satisfies one or more predetermined criteria; and
- encode the three color values of each of the pixels in the first pixel block as a single quantized value based on a projection of the three-dimensional point associated with that pixel onto the line.

10. The system of claim 9, wherein the one or more computer-readable non-transitory storage media comprises further instructions that when executed by the one or more processors, cause the system to perform:
- access a second pixel block of an image, the second block comprising pixels that are each associated with three color values;
- determine whether to separately encode or jointly encode the three color values of each of the pixels of the second pixel block;
- determine that the three color values of each of the pixels in the second pixel block are to be separately encoded based on:
  - determining, based on the three color values of each of the pixels of the second pixel block, a line defined within the three-dimensional coordinate system; and
  - determining that the line does not satisfy one or more of the predetermined criteria; and encode the three color values of each of the pixels in the second pixel block separately.

11. The system of claim 9, wherein determining that the line satisfies the one or more predetermined criteria comprises:
analyzing the three color values of each of the pixels in the first pixel block based on Principal Component Analysis;
determining, in response to the analyzing, that the line corresponds to a dominant eigenvector and a largest eigenvalue.

12. The system of claim 9, wherein encoding the three color values of each of the pixels in the first pixel block as the single quantized value based on the projection of the three-dimensional point associated with that pixel onto the line comprises:
partitioning the line into a plurality of bins, each bin being associated with a single quantized value corresponding with a portion of the line;
for each of the pixels in the first pixel block:
projecting the three-dimensional point associated with the pixel onto the line;
identifying a bin of the plurality of bins that the projection of the three-dimensional point falls onto; and
encoding the three color values of the pixel as the single quantized value corresponding to the identified bin.

13. The system of claim 9, wherein the one or more computer-readable non-transitory storage media comprises further instructions that when executed by the one or more processors, cause the system to perform:
for each of the pixels in the first pixel block:
decode the encoded three color values of the pixel by determining a three-dimensional point on the three-dimensional coordinate system that corresponds to the single quantized value associated with the projection of the three-dimensional point associated with that pixel on the line.

14. The system of claim 9, wherein determining that the three color values of each of the pixels in the first pixel block are to be jointly encoded is further based on, one or more of:
determining whether a pixel range associated with each of the three color values of the pixels in the first pixel block are under a threshold value; or
determining whether a number of the pixels in the first pixel block that are associated over-exposure is less than a threshold number.

15. One or more computer-readable non-transitory storage media storing instructions that, when executed by one or more processors included in one or more computing devices, cause the one or more computing devices to perform:
access a first pixel block of an image, the first pixel block comprising pixels that are each associated with three color values;
determine whether to separately encode or jointly encode the three color values of each of the pixels of the first pixel block;
determine that the three color values of each of the pixels in the first pixel block are to be jointly encoded based on:
determining, based on the three color values of each of the pixels of the first pixel block, a line defined within a three-dimensional coordinate system in which each of the pixels is represented as a three-dimensional point; and
determining that the line satisfies one or more predetermined criteria; and
encode the three color values of each of the pixels in the first pixel block as a single quantized value based on a projection of the three-dimensional point associated with that pixel onto the line.

16. The one or more computer-readable non-transitory storage media of claim 15 storing further instructions that, when executed by one or more processors included in one or more computing devices, cause the one or more computing devices to perform:
access a second pixel block of an image, the second block comprising pixels that are each associated with three color values;
determine whether to separately encode or jointly encode the three color values of each of the pixels of the second pixel block;
determine that the three color values of each of the pixels in the second pixel block are to be separately encoded based on:
determining, based on the three color values of each of the pixels of the second pixel block, a line defined within the three-dimensional coordinate system; and
determining that the line does not satisfy one or more of the predetermined criteria; and
encode the three color values of each of the pixels in the second pixel block separately.

17. The one or more computer-readable non-transitory storage media of claim 15, wherein determining that the line satisfies the one or more predetermined criteria comprises:
analyzing the three color values of each of the pixels in the first pixel block based on Principal Component Analysis;
determining, in response to the analyzing, that the line corresponds to a dominant eigenvector and a largest eigenvalue.

18. The one or more computer-readable non-transitory storage media of claim 15, wherein encoding the three color values of each of the pixels in the first pixel block as the single quantized value based on the projection of the three-dimensional point associated with that pixel onto the line comprises:
partitioning the line into a plurality of bins, each bin being associated with a single quantized value corresponding with a portion of the line;
for each of the pixels in the first pixel block:
projecting the three-dimensional point associated with the pixel onto the line;
identifying a bin of the plurality of bins that the projection of the three-dimensional point falls onto; and
encoding the three color values of the pixel as the single quantized value corresponding to the identified bin.

19. The one or more computer-readable non-transitory storage media of claim 15 storing further instructions that, when executed by one or more processors included in one or more computing devices, cause the one or more computing devices to perform:
for each of the pixels in the first pixel block:
decode the encoded three color values of the pixel by determining a three-dimensional point on the three-dimensional coordinate system that corresponds to the single quantized value associated with the projection of the three-dimensional point associated with that pixel on the line.

20. The one or more computer-readable non-transitory storage media of claim 15, wherein determining that the three color values of each of the pixels in the first pixel block are to be jointly encoded is further based on, one or more of:
- determining whether a pixel range associated with each of the three color values of the pixels in the first pixel block are under a threshold value; or
- determining whether a number of the pixels in the first pixel block that are associated over-exposure is less than a threshold number.

* * * * *